(12) United States Patent
Kozasa et al.

(10) Patent No.: US 8,919,232 B2
(45) Date of Patent: Dec. 30, 2014

(54) OPTICAL FILM TRANSPORT METHOD, AND APPARATUS USING THE SAME

(71) Applicants: Nitto Denko Corporation, Ibaraki-shi, Osaka (JP); Akebono Machine Industries Co., Ltd., Konosu-shi, Saitama (JP)

(72) Inventors: Junpei Kozasa, Ibaraki (JP); Shoji Negishi, Konosu (JP)

(73) Assignees: Nitto Denko Corporation, Osaka (JP); Akebono Machine Industries Co., Ltd., Saitama (JP)

(*) Notice: Subject to any disclaimer, the term of this patent is extended or adjusted under 35 U.S.C. 154(b) by 0 days.

(21) Appl. No.: 14/060,427

(22) Filed: Oct. 22, 2013

(65) Prior Publication Data

US 2014/0041497 A1 Feb. 13, 2014

Related U.S. Application Data

(62) Division of application No. 12/676,524, filed as application No. PCT/JP2008/064747 on Aug. 19, 2008, now Pat. No. 8,601,921.

(51) Int. Cl.

| | | |
|---|---|---|
| *B65H 35/04* | (2006.01) | |
| *B65H 35/00* | (2006.01) | |
| *B23K 26/08* | (2014.01) | |
| *B23K 26/14* | (2014.01) | |
| *B23K 26/38* | (2014.01) | |
| *B23K 26/40* | (2014.01) | |
| *B65H 20/04* | (2006.01) | |
| *B65H 20/32* | (2006.01) | |

(52) U.S. Cl.
CPC ........ *B65H 35/0073* (2013.01); *B23K 26/0846* (2013.01); *B23K 26/1405* (2013.01); *B23K 26/38* (2013.01); *B23K 26/4065* (2013.01); *B23K 26/409* (2013.01); *B65H 20/04* (2013.01); *B65H 20/32* (2013.01); *B65H 35/04* (2013.01); *B65H 2301/51536* (2013.01); *B65H 2404/14* (2013.01); *B65H 2404/1441* (2013.01); *B65H 2701/1752* (2013.01)

USPC ................................................. 83/79; 83/236

(58) Field of Classification Search
USPC ......... 83/23, 26, 79, 110, 236, 257, 261, 262, 83/267
See application file for complete search history.

(56) References Cited

U.S. PATENT DOCUMENTS 5,853,170 A 12/1998 Achelpohl et al.
(Continued)

FOREIGN PATENT DOCUMENTS

CN 1141261 A 1/1997
(Continued)

OTHER PUBLICATIONS

Taiwanese Office Action for the Application No. 097132262 dated Oct. 30, 2013.
Notification of Reexamination for the Application No. 200880024712.X from The State Intellectual Property Office of P.R. China dated Jun. 3, 2014.
(Continued)

*Primary Examiner* — Stephen Choi
(74) *Attorney, Agent, or Firm* — Cheng Law Group, PLLC

(57) ABSTRACT

In a process of transporting a strip-shaped optical film F, the optical film F is cut to a predetermined length. Thereafter, the sheet-like optical films F divided by the cutting are intermittently transported while the strip-shaped optical film F is fed by the predetermined length such that a portion to be cut next reaches a cutting action position. Further, a leading one of the sheet-like optical films F in the intermittent transport process is transported to a continuous transport process such that a rear end thereof passes the intermittent transport process in a subsequent intermittent transport operation. Herein, the sheet-like optical film F is transported to the downstream-side continuous transport process following the intermittent transport process to continuously transport the optical film F.

4 Claims, 4 Drawing Sheets

(56) References Cited

U.S. PATENT DOCUMENTS

| | | |
|---|---|---|
| 6,073,527 A | 6/2000 | Harter et al. |
| 2003/0208988 A1 | 11/2003 | Buckley |
| 2005/0132664 A1 | 6/2005 | Bettini |
| 2005/0139526 A1 | 6/2005 | Wilke |
| 2011/0203430 A1* | 8/2011 | Nakai et al. .................. 83/18 |

FOREIGN PATENT DOCUMENTS

| | | |
|---|---|---|
| JP | 49-122580 U | 10/1974 |
| JP | 6-15159 U | 2/1994 |
| JP | 11-49401 A | 2/1999 |
| JP | 2000-1239 A | 1/2000 |
| JP | 2001-47394 A | 2/2001 |

OTHER PUBLICATIONS

Taiwanese Office Action for the Application No. 097132262 dated Jun. 18, 2014.
International Search Report for Application No. PCT/JP2008/064747 mailed Oct. 7, 2008.
The First Office Action for the Application No. 200880024712.X from The State Intellectual Property Office of the People's Republic of China dated May 2, 2012.
Decision of Rejection for the Application No. 200880024712.X from The State Intellectual Property Office of the People's Republic of China dated Feb. 4, 2013.
Taiwanese Office Action for the Application No. 097132262 dated Jun. 20, 2013.

* cited by examiner

OPTICAL FILM TRANSPORT METHOD, AND APPARATUS USING THE SAME

CROSS REFERENCE TO RELATED APPLICATIONS

This application is a Divisional Application of patent application Ser. No. 12/676,524, filed on Mar. 4, 2010 which is a 371 application of Application No. PCT/JP2008/064747, filed Aug. 19, 2008, the entire contents of which are hereby incorporated by reference.

TECHNICAL FIELD

The present invention relates to an optical film transport method capable of accurately transporting an optical film such as a polarizing film, a brightness enhancement film or a retardation film to be bonded to a substrate for use in a liquid crystal panel or the like, without causing damage and the like to the optical film, and an apparatus using the same.

BACKGROUND ART

A conventional method for transporting a sheet-like optical film has been performed as follows. When a sheet-shaped workpiece is transferred between contiguous upstream and downstream conveyors, a sensor detects a point in time when a front end of the sheet-shaped workpiece passes the upstream conveyor. The sheet-shaped workpiece is transferred onto the downstream conveyor while air is ejected from a lower position between the upstream and downstream conveyors toward the sheet-shaped workpiece passing above the position (refer to Patent Document 1).

In a sheet-like member transport apparatus having a configuration that a plurality of rotating roll shafts are arranged in parallel at regular intervals and a sheet-like member is transported along a path line of an object to be transferred which is placed on the roll shafts, moreover, an auxiliary plate or a blush is disposed at every space between the adjacent roll shafts to prevent a fall of a front end of the sheet-like member. Alternatively, an air nozzle is disposed at such a space to eject air toward the sheet-like member passing thereabove (Patent Document 2).
Patent Document 1: JP 2000-1239 A
Patent Document 2: JP 11-49401 A

DISCLOSURE OF THE INVENTION

Problems to be Solved by the Invention

However, the conventional apparatus has the following problems. Specifically, the object to be transported is subjected to predetermined processing, examination and the like in the process of transporting the object to be transported along the plurality of transport conveyors arranged contiguously. Consequently, there is a necessity to halt a specific one of the transport conveyors. That is, the plurality of transport conveyors include one that intermittently operates in the transporting step and one that continuously transports an object to be transported. In such an apparatus configuration, there is a possibility that the intermittent transport conveyor on the upstream side is disadvantageously halted before the object to be transported is completely transferred to the continuous transport conveyor on the downstream side. In other words, the transport of the object to be transported is occasionally halted in a state in which the object to be transported lies on both the upstream and downstream transport conveyors. In such a case, a front end of the object to be transported rubs against a belt of the continuous transport conveyor in a state of coming into contact with the belt. Consequently, there arises a problem that the rubbing degrades quality of the object to be transported.

This invention has been devised in view of the circumstances described above, and a principal objective thereof is to provide an optical film transport method capable of accurately transporting an optical film without causing damage such as a scratch to the optical film in a process of transporting the optical film, and an apparatus using the same.

Solutions to the Problems

In order to accomplish the objective described above, this invention employs the following configuration.

That is, this inventive method is an optical film transport method for transporting a sheet-like optical film, and the optical film transport method includes: cutting a strip-shaped optical film to a predetermined length in a process of transporting the optical film; and intermittently transporting the sheet-like optical films divided by the cutting while feeding the strip-shaped optical film by the predetermined length such that a portion to be cut next reaches a cutting action position, feeding a leading one of the sheet-like optical films in the intermittent transport process such that a rear end of the leading optical film passes the intermittent transport process in a subsequent intermittent transport operation, and transferring the leading optical film to a downstream-side continuous transport process following the intermittent transport process to continuously transport the sheet-like optical film.

According to this method, the sheet-like optical films divided by the cutting are intermittently transported. Thus, the optical films are transported at a predetermined pitch without overlapping each other after being cut. Moreover, the leading optical film in the intermittent transport process is fed so as to pass the intermittent transport process in the subsequent intermittent transport operation, and then is transferred to the continuous transport process on the downstream side. Therefore, there is no possibility that the transport of the optical film is halted in a state in which the optical film lies on both the intermittent transport process and the continuous transport process. That is, there is no possibility that the front end of the optical film held in the intermittent transport process is scratched because of contact with the continuous transport process, which operates continuously, for a predetermined period of time. Accordingly, it is possible to suppress degradation in quality of the optical film in the transport process.

Preferably, the inventive method described above includes ejecting a gas toward the optical film from a lower position with respect to the optical film passing between the intermittent transport process and the continuous transport process.

According to this method, the optical film can be transferred from the intermittent transport process to the continuous transport process in a state in which the front end thereof is lifted upward. That is, even when the front end of the optical film is bent downward because of its own weight, the optical film can be transferred onto the continuous transport process in such a manner that the front end thereof is lifted upward until a degree of the bending is canceled. Accordingly, there is no possibility that the front end of the optical film to be transferred to the continuous transport process rubs against a drive unit such as a transport belt in the continuous transport process.

In order to accomplish the objective described above, this invention also employs the following configuration.

That is, an optical film transport apparatus for transporting a sheet-like optical film includes: a supply device that supplies a strip-shaped optical film; a cutting device that cuts the optical film to a predetermined length; an intermittent transport device that intermittently transports the sheet-like optical films divided by the cutting; a continuous transport device that receives the optical film from the intermittent transport device and continuously transports the optical film; and a control device that exerts control such that the intermittent transport device intermittently transports the sheet-like optical films divided by the cutting while the supply device feeds the strip-shaped optical film by the predetermined length such that a portion to be cut of the optical film as a target to be cut sequentially by the cutting device reaches a cutting action position, and then, the intermittent transport device transfers a leading one of the optical films to the downstream-side continuous transport device following the intermittent transport device such that a rear end of the leading optical film passes the intermittent transport device in a subsequent intermittent transport operation.

According to this configuration, there is no possibility that the transport of the sheet-like optical film is halted in a state in which the front end of the optical film comes into contact with the continuous transport device whereas the rear end of the optical film lies on the intermittent transport device. That is, there is no possibility that the front end of the optical film is scratched because of contact with the continuous transport device for a predetermined period of time. Thus, it is possible to suppress degradation in quality of the optical film. Accordingly, it is possible to suitably realize the inventive method described above.

Preferably, the optical film transport apparatus includes a gas ejection device that ejects a gas toward the optical film from a lower position with respect to the optical film passing between the intermittent transport device and the continuous transport device.

According to this configuration, it is possible to suitably realize the inventive method described above.

Effects of the Invention

In the optical film transport method according to the present invention and the apparatus using the same, even when an optical film is transported between a plurality of contiguous transport processes including an intermittently operating transport process and a continuously operating transport process, there is no possibility that the transport of the optical film is halted in a state in which the optical film lies on both the transport processes. Thus, there is no possibility that a front end of the optical film rubs against the continuously operating transport process on the downstream side at the time when the optical film is transferred between the transport processes. Accordingly, it is possible to suppress degradation in quality of the optical film.

DESCRIPTION OF REFERENCE SYMBOLS

Figure 1:
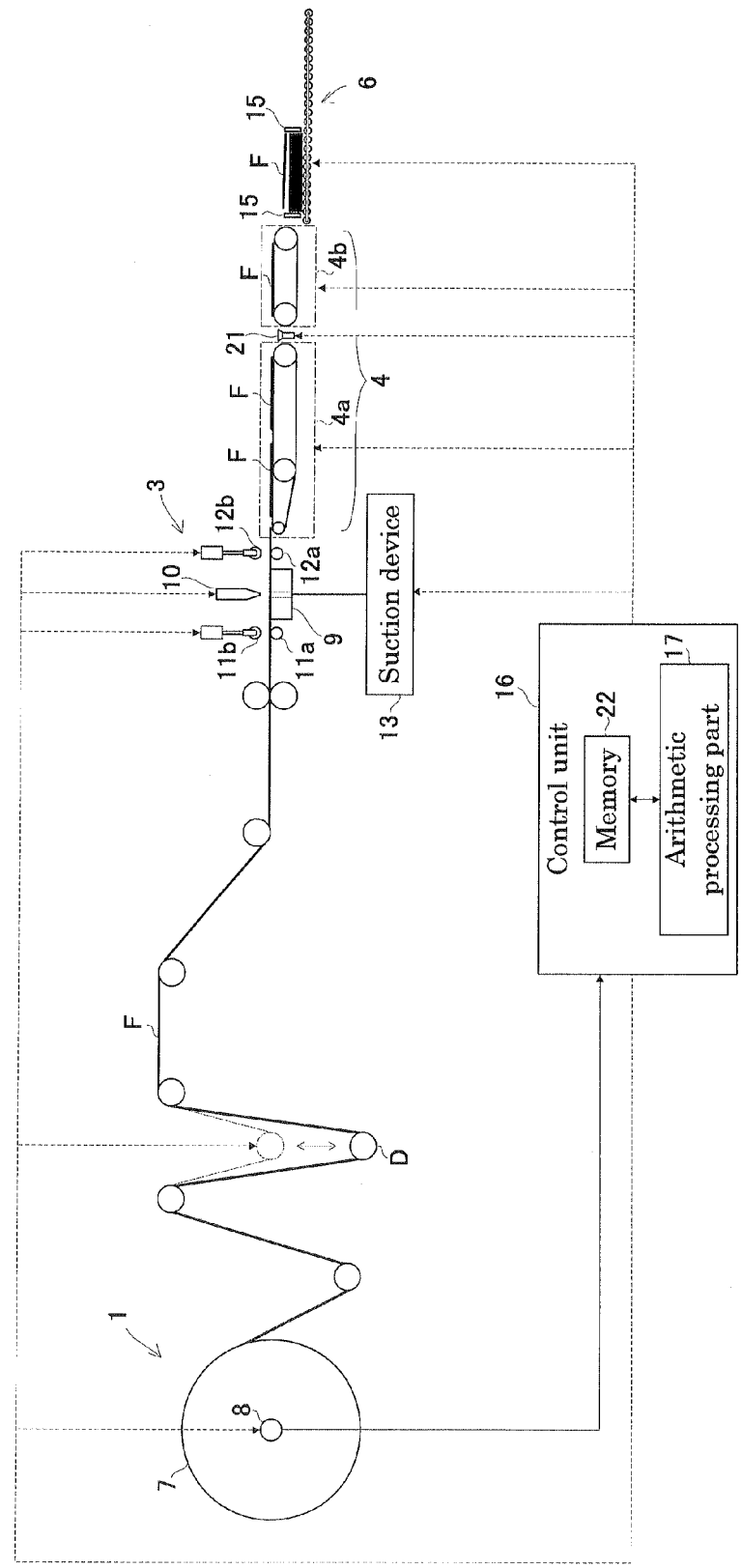
FIG. 1 shows a front view of a general configuration of an optical film cutting apparatus according to an embodiment of the present invention.

1 . . . Film supply unit
3 . . . Cutting mechanism
4 . . . Transport mechanism
4a . . . Intermittent transport conveyor
4b . . . Continuous transport conveyor
6 . . . Carrying mechanism
9 . . . Suction table
11 . . . Nip roller
11a . . . Drive roller
12 . . . Nip roller
12a . . . Drive roller
16 . . . Control unit
22 . . . Memory
F . . . Polarizing film

BEST MODE FOR CARRYING OUT THE INVENTION

With reference to the drawings, hereinafter, description will be given of embodiments of the present invention. In the present invention, an optical member is not particularly limited as long as it is a flexible, strip-shaped and functional film such as a polarizing film, a retardation film or a brightness enhancement film. In the embodiment of the present invention, description will be given of a case of employing a polarizing film by way of example.

FIG. 1 shows a schematic configuration of an optical film cutting apparatus that performs an optical film cutting method according to the present invention and involves steps in which cut optical films are housed in a stack manner and are made carriable.

The apparatus according to this embodiment includes a film supply unit 1 that feeds and supplies a polarizing film F, a cutting mechanism 3 that cuts the polarizing film F to a predetermined length in a transport direction, a transport mechanism 4 that transports the cut polarizing film F at a terminal end of a transport path, a carrying mechanism 6 that carries the polarizing film F, which is transported by the transport mechanism 4, to a subsequent step, and the like. It is to be noted that the film supply unit 1 corresponds to a supply device according to the present invention.

In the film supply unit 1, a bobbin 8 is loaded with a master roll 7 which is the polarizing film F in a roll state. Herein, the polarizing film F, which is wide in width, is slit to a predetermined dimension so as to have a strip shape. The bobbin 8 is coupled to a drive device such as a motor. It is to be noted that the film supply unit 1 corresponds to the supply device according to the present invention.

A dancer roller D is disposed between the film supply unit 1 and the cutting mechanism 3. The dancer roller D accumulates a feed amount of the polarizing film F supplied by the film supply unit 1, until the polarizing film F suction-held on a suction table 9 of the cutting mechanism 3 is cut by a laser device 10 and then the suction-holding is canceled.

The cutting mechanism 3 includes the suction table 9 that suction-holds a back side of the polarizing film F, the laser device 10, and a pair of nip rollers 11 and 12 that are disposed on upstream and downstream sides of the laser device 10, respectively, with the laser device 10 located therebetween to nip the polarizing film F. It is to be noted that the laser device 10 corresponds to a cutting device according to the present invention.

Figure 2:
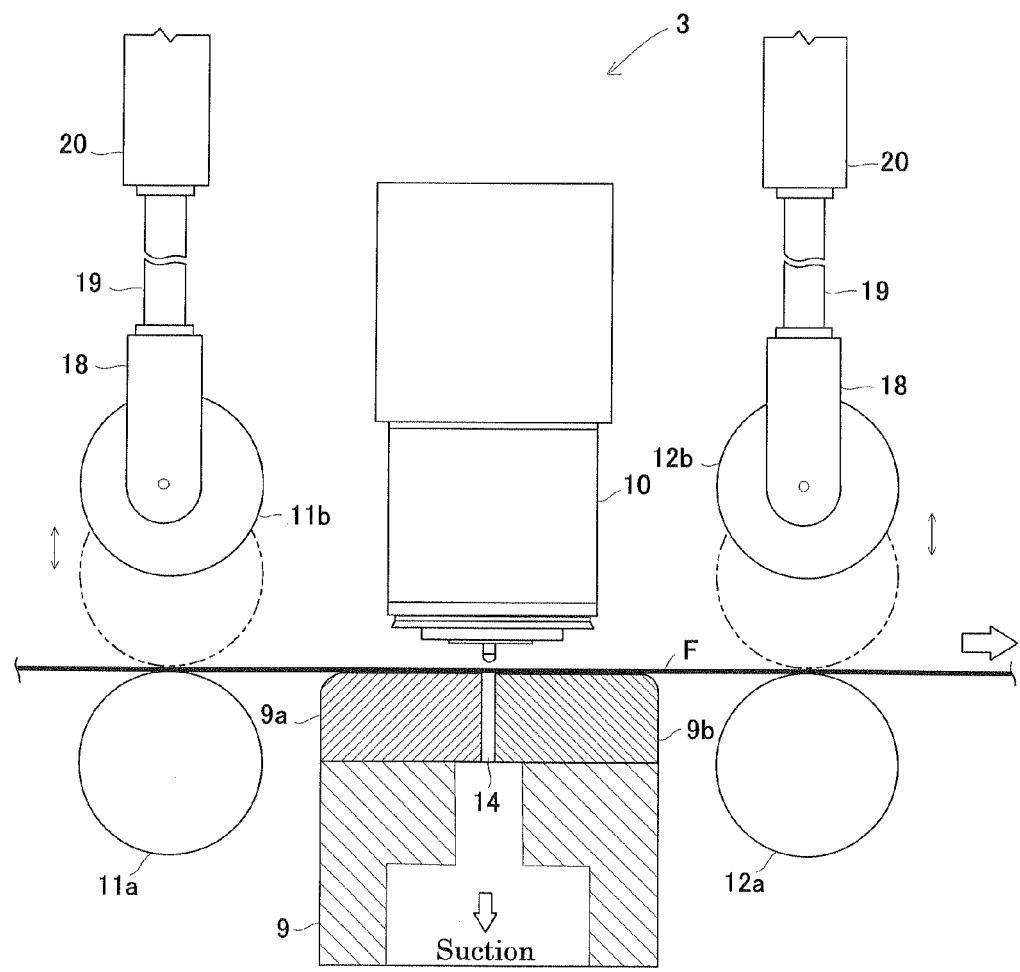
FIG. 2 shows a fractional section view of main components of a cutting mechanism.

As shown in FIGS. 1 and 2, two holding blocks 9a and 9b, which are identical in height with each other, are coupled to and fastened to a surface of the suction table 9 that communicates with and is connected to a suction device 13, with a bolt or the like in proximity to each other along the transport direction of the polarizing film F. That is, opposed inner sidewalls of the holding blocks 9a and 9b form a suction groove 14 which is orthogonal to the transport direction of the polarizing film F. In other words, the suction groove 14 serves as a scan path of a laser beam emitted from the laser device 10.

The laser device 10 is horizontally movable so as to cut the polarizing film F along the suction groove 14 in a width direction.

As shown in FIG. 2, the nip roller 11 (12) includes a lower drive roller 11a (12a) that is coupled to and fastened to a drive mechanism such as a motor and can feed the polarizing film F, and a roller 11b (12b) that vertically moves between an upper standby position and an action position where the roller 11b (12b) nips the polarizing film F in cooperation with the drive roller. The vertical movement of the roller 11b (12b) is effected by an air cylinder 20 that is coupled through a rod 19 to a bracket 18 fastened to a center shaft of the roller with a screw.

In the apparatus according to this embodiment, the nip roller 11 (12) has a diameter of 30 mm, and is made of a metal material having a surface coated with an elastic material such as urethane having a hardness of about 30 to 90. The drive rollers 11a and 12a are driven at a predetermined speed in synchronization with each other.

Figure 3:
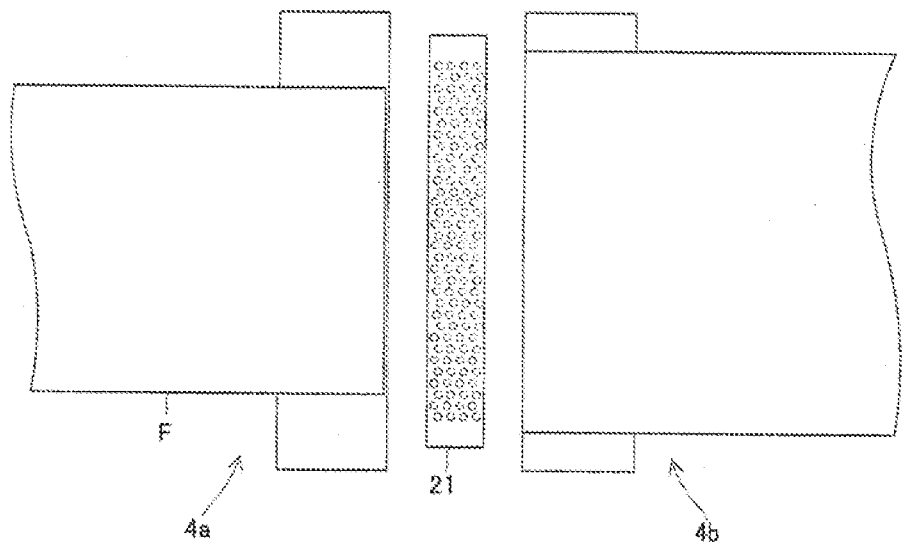
FIG. 3 shows a plan view of a periphery of an air supply device.

The transport mechanism 4 includes an intermittent transport conveyor 4a that is provided with a transport belt intermittently transporting the polarizing film F, which is intermittently fed by the nip roller 12 and is placed thereon, in accordance with the intermittent operation of the nip roller, and a continuous transport conveyor 4b that is disposed on a downstream side of the intermittent transport conveyor 4a with a predetermined gap formed therebetween to continuously operate. As shown in FIG. 3, moreover, an air supply device 21 having a punching plate which is equal in width to the belt is disposed between the transport conveyors 4a and 4b.

In the apparatus according to this embodiment, the intermittent transport conveyor 4a has a length set such that the intermittent transport conveyor 4a can planarly hold two polarizing films F, which is divided by cutting, at a predetermined pitch. On the other hand, the continuous transport conveyor 4b has a length set such that the continuous transport conveyor 4b can planarly hold one polarizing film. It is to be noted that the intermittent transport conveyor 4a corresponds to an intermittent transport device according to the present invention, the continuous transport conveyor 4b corresponds to a continuous transport device according to the present invention, and the air supply device 21 corresponds to a gas ejection device according to the present invention.

The carrying mechanism 6 includes roller conveyors that are contiguously disposed at a position below a terminal end of the transport mechanism 4. Moreover, a tray 15 is provided at a starting end of the carrying mechanism 6, and receives the polarizing film F which falls from the transport mechanism 4.

A control unit 16 activates the intermittent transport conveyor 4a in synchronization with the operation that the drive roller 12a feeds the sheet-like polarizing film F cut by the laser device 10. Specifically, the control unit 16 makes a transport speed of the intermittent transport conveyor 4a faster than a feed speed of the drive roller 12a. That is, two polarizing films F divided by cutting are planarly held on the intermittent transport conveyor 4a at a predetermined pitch. In order to perform a subsequent intermittent transport operation in a state in which the two polarizing films F are placed on and held on the intermittent transport conveyor 4a, further, the control unit 16 activates the intermittent transport conveyor 4a such that a leading one of the polarizing films F passes the intermittent transport conveyor 4a to completely lie on the continuous transport conveyor 4b on the downstream side.

The control unit 16 includes an internal memory 22 that previously stores a recipe which is obtained from the transport speed of the intermittent transport conveyor 4a with respect to the feed speed of the drive roller 12a and a relation between the length of the sheet-like polarizing film F and the pitch between the polarizing films F.

Figure 4:
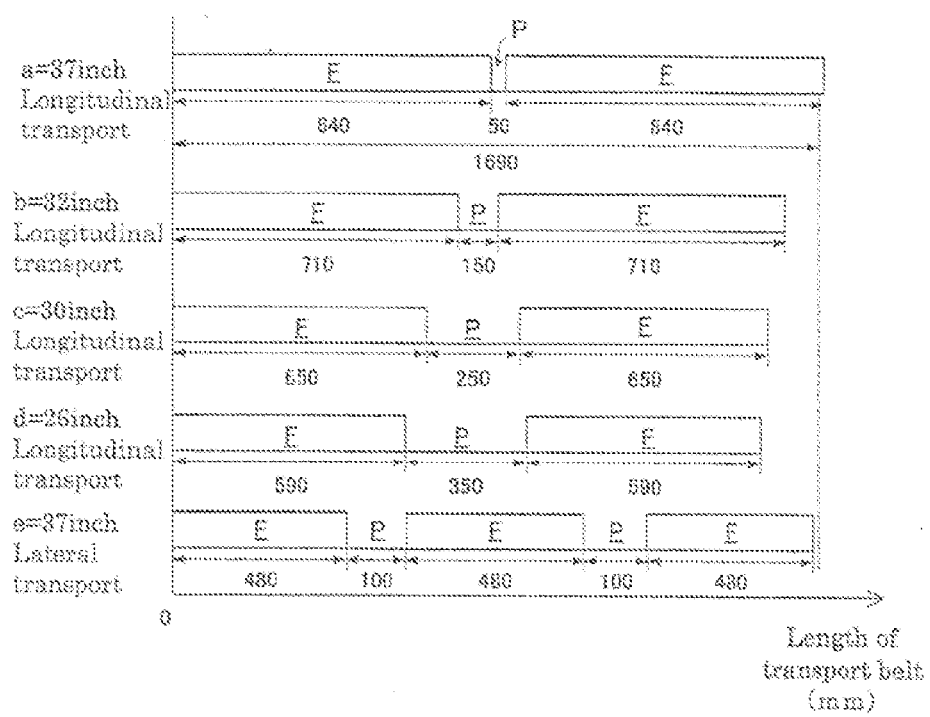
FIG. 4 shows a schematic diagram of a recipe stored in a memory.

In this embodiment, the memory 22 of the control unit 16 previously stores recipes "a" to "e" shown in FIG. 4. As shown in the figure, in the recipe "a" stored in the memory 22, for example, the length of the top surface-side transport belt is set at 1690 mm, two sheet-like polarizing films of 37 inches are set to be of the length of 840 mm, and the pitch P thereof is set at 50 mm. In this embodiment, the intermittent transport conveyor 4a is activated such that the polarizing film F completely lies on the continuous transport conveyor 4b. Therefore, the gap formed between the conveyors is set at the pitch P or less between the polarizing films F.

Moreover, the control unit 16 performs overall control of each mechanism, in addition to the setting of the recipe described above. Description of the control of the respective mechanisms will be given later as description of operations of the apparatus described above.

The above description is about the configurations and functions of the main components of the optical film cutting apparatus according to the present invention. Next, description will be given of the operations of this apparatus, that is, the operations from the cutting of the strip-shaped polarizing film F to the carriage of the sheet-like polarizing film F.

First, the film supply unit 1 is loaded with a master roll 7 of a polarizing film F to be used herein. After completion of the loading, an operator conducts initial settings by use of an operation panel or the like.

For example, the operator sets a length of the cut polarizing film F, a thickness of the polarizing film F, a supply speed of the polarizing film F, output power of a laser beam, a focal depth of the laser beam, a feed speed of the drive roller 12a, and the like.

After completion of the initial settings, the film supply unit 1 starts to supply the polarizing film F from the master roll 7. Further, a sensor such as a rotary encoder (not shown) detects a rotation speed of a drive shaft of the motor or the like of the film supply unit 1. Thus, the polarizing film F is supplied.

Figure 5:
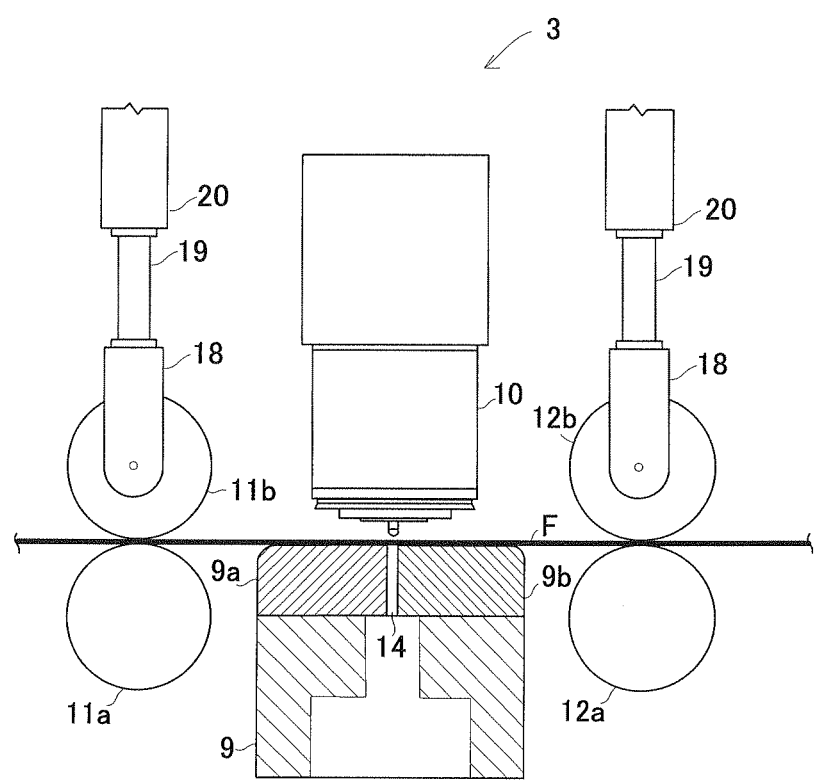
FIG. 5 shows a front view of an operation of a nip roller.

The polarizing film F is transported to the cutting mechanism 3. When a front end of the polarizing film F passes through the nip roller 12 and then reaches a predetermined position, the control unit 16 exerts control to activate the nip rollers 11 and 12, so that the nip rollers 11 and 12 nip the polarizing film F at opposed ends of the suction table. As shown in FIG. 5, herein, the air cylinders 20 coupled to the rollers 11b and 12b are synchronized to simultaneously move the rollers 11b and 12b downward.

Moreover, the control unit 16 activates the suction device 13 in this state, so that the suction table 9 suction-holds the polarizing film F.

In accordance with these operations, the control unit 16 exerts control to activate the dancer roller D such that the polarizing film F which is continuously supplied by the film supply unit 1 does not pass the dancer roller D.

The laser device 10 cuts the polarizing film F, which is suction-held on the suction table 9, along the suction groove 14 in the width direction.

When the polarizing film F is cut, the suction by the suction table 9 and the nip by the nip rollers 11 and 12 are canceled. In accordance with this cancelation, the control unit 16 activates the drive rollers 11a and 12a, the intermittent transport conveyor 4a, and the air supply device 21. That is, the control unit 16 retrieves an optimum recipe from the memory 22 on the basis of the initial settings. In accordance with the recipe, the control unit 16 exerts control to activate the drive rollers 11a and 12a, and the intermittent transport conveyor 4a such that the sheet-like polarizing film F which is intermittently fed from the upstream cutting mechanism 3 side is planarly held at a predetermined pitch relative to the polarizing film F on the intermittent transport conveyor 4a. Simultaneously, the control unit 16 exerts control to activate the intermittent transport conveyor 4a such that a leading one of the polarizing films F completely lies on the continuous transport conveyor 4b. Further, the control unit 16 controls the air supply device 21 disposed between the conveyors such that the air supply device 21 supplies air toward the polarizing film F passing thereabove during a period that the polarizing film F is transferred from the intermittent transport conveyor 4a to the continuous transport conveyor 4b.

The polarizing film F transferred to the continuous transport conveyor 4b is transported to the carrying mechanism 6. Simultaneously, the control unit 16 exerts control to activate the dancer roller D such that the polarizing film F is fed toward the cutting mechanism 3.

The tray 15 is provided at the starting end of the carrying mechanism 6. Accordingly, the polarizing films F falling from the terminal end of the transport mechanism 4 are consecutively housed in the tray 15.

When the polarizing films F in predetermined number are stacked on the tray 15 by repetition of the series of operations described above, the tray 15 moves to a retract position. Thereafter, the carrying mechanism 6 is activated to carry the stacked polarizing films F to a subsequent step.

In the apparatus according to this embodiment, in synchronization with the operation of intermittently feeding the polarizing film F from the cutting mechanism 3, the intermittent transport conveyor 4a can 25 intermittently operate at the speed faster than the feed speed, so that the polarizing films can be transported at a predetermined pitch without overlapping each other. Moreover, a leading one of the polarizing films F on the intermittent transport conveyor 4a can completely lie on the continuous transport conveyor 4b on the downstream side in a subsequent intermittent transport operation. Thus, there is no possibility that the transport of the polarizing film F is halted in the state in which the front end of the polarizing film F comes into contact with and rubs against the continuous transport conveyor 4b. Accordingly, it is possible to suppress degradation in quality of the polarizing film F.

Moreover, the air supply device 21 disposed between the conveyors ejects air toward the polarizing film F passing thereabove. Thus, the air can prevent the front end of the polarizing film F from being bent downward because of its own weight. In other words, the polarizing film F can be transferred onto the continuous transport conveyor 4b in a state in which the front end thereof is lifted upward.

The present invention may be embodied in forms modified as described below.

(1) In the apparatus according to the foregoing embodiment, the number of sheet-like polarizing films F to be planarly held on the intermittent transport conveyor 4a is not limited to two. For example, this number may be one. Alternatively, this number may be three or more in a case of the recipe "e" (37-inch lateral transport on the intermittent transport conveyor 4a) shown in FIG. 4. Likewise, the number of polarizing films F to be planarly held on the continuous transport conveyor 4b is not limited.

(2) In the apparatus according to the foregoing embodiment, the air supply device 21 may intermittently operate in accordance with the operation of the intermittent transport conveyor 4a. Alternatively, the air supply device 21 may continuously supply air.

(3) In the apparatus according to the foregoing embodiment, a combination of a pair of upper and lower rollers that form the nip roller 11 (12) is not limited to that described in the foregoing embodiment, and any other combination may be employed in the present invention. As such a combination, for example, the drive roller 11a (12a) may be made of a metal material whereas the upper roller 11b (12b) may be made of an elastic material.

(4) The apparatus according to the foregoing embodiment is also applicable to a polarizing film with a separator.

INDUSTRIAL APPLICABILITY

As described above, the present invention is suitable for accurately transporting an optical film.

The invention claimed is:

1. An optical film transport apparatus for transporting a sheet-like optical film, comprising:
   a supply device that supplies a strip-shaped optical film;
   a cutting device that cuts the optical film to a predetermined length;
   an intermittent transport device that intermittently transports the sheet-like optical films divided by the cutting;
   a continuous transport device that receives the optical film from the intermittent transport device and continuously transports the optical film; and
   a control device that exerts control such that the intermittent transport device intermittently transports the sheet-like optical films divided by the cutting, while the supply device feeds the strip-shaped optical film by the predetermined length such that a portion to be cut of the optical film as a target to be cut sequentially by the cutting device reaches a cutting action position, and then, the intermittent transport device transfers a leading one of the optical films to the downstream-side continuous transport device following the intermittent transport device such that a rear end of the leading optical film passes the intermittent transport device in a subsequent intermittent transport operation.

2. The optical film transport apparatus as set forth in claim 1, wherein
   the control device exerts control such that the rear end of the leading optical film on the intermittent transport device completely lies on the downstream-side continuous transport device, which follows the intermittent transport device, in the subsequent intermittent transport operation.

3. The optical film transport device as set forth in claim 1, comprising
   a gas ejection device that ejects a gas toward the optical film from a lower position with respect to the optical film passing between the intermittent transport device and the continuous transport device.

4. The optical film transport device as set forth in claim 2, comprising
   a gas ejection device that ejects a gas toward the optical film from a lower position with respect to the optical film passing between the intermittent transport device and the continuous transport device.

* * * * *